US008436829B1

(12) United States Patent
Zhai et al.

(10) Patent No.: US 8,436,829 B1
(45) Date of Patent: May 7, 2013

(54) TOUCHSCREEN KEYBOARD SIMULATION FOR PERFORMANCE EVALUATION

(75) Inventors: Shumin Zhai, Los Altos, CA (US); Shiri Azenkot, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/618,773

(22) Filed: Sep. 14, 2012

Related U.S. Application Data

(60) Provisional application No. 61/539,113, filed on Jan. 31, 2012.

(51) Int. Cl.
*G09G 5/00* (2006.01)
*G06F 3/041* (2006.01)
*G06F 3/048* (2006.01)

(52) U.S. Cl.
USPC ............................ 345/173; 345/156; 715/773

(58) Field of Classification Search .......... 345/156–184, 345/104; 715/773; 703/13–28; 178/18.01–20.04
See application file for complete search history.

(56) References Cited

U.S. PATENT DOCUMENTS

| 5,650,597 | A | * | 7/1997 | Redmayne | 178/18.06 |
|---|---|---|---|---|---|
| 6,741,237 | B1 | * | 5/2004 | Benard et al. | 345/173 |
| 7,362,313 | B2 | * | 4/2008 | Geaghan et al. | 345/173 |
| 2002/0070926 | A1 | * | 6/2002 | Kavanagh | 345/173 |
| 2004/0164970 | A1 | * | 8/2004 | Benard et al. | 345/177 |
| 2004/0183787 | A1 | * | 9/2004 | Geaghan et al. | 345/173 |
| 2006/0066588 | A1 | * | 3/2006 | Lyon et al. | 345/173 |
| 2006/0152496 | A1 | * | 7/2006 | Knaven | 345/172 |
| 2006/0202969 | A1 | * | 9/2006 | Hauck | 345/173 |
| 2008/0246731 | A1 | * | 10/2008 | Chechelniker | 345/168 |
| 2008/0309622 | A1 | * | 12/2008 | Krah | 345/173 |
| 2009/0213083 | A1 | * | 8/2009 | Dicker et al. | 345/173 |
| 2010/0095234 | A1 | * | 4/2010 | Lane et al. | 715/773 |
| 2011/0257958 | A1 | * | 10/2011 | Kildevaeld | 703/23 |
| 2011/0310041 | A1 | * | 12/2011 | Williams et al. | 345/173 |
| 2012/0187956 | A1 | * | 7/2012 | Uzelac et al. | 324/537 |
| 2012/0188176 | A1 | * | 7/2012 | Uzelac et al. | 345/173 |
| 2012/0188197 | A1 | * | 7/2012 | Uzelac et al. | 345/174 |
| 2012/0191394 | A1 | * | 7/2012 | Uzelac et al. | 702/79 |

\* cited by examiner

*Primary Examiner* — Alexander Eisen
*Assistant Examiner* — Patrick F Marinelli
(74) *Attorney, Agent, or Firm* — Shumaker & Sieffert, P.A.

(57) ABSTRACT

A computerized system sends a series of touchscreen keyboard touch data to a touchscreen keyboard device that receives the touchscreen keyboard touch data and processes the received string of touchscreen keyboard touch data to simulate touches to a touchscreen of the touchscreen keyboard device. A touchscreen keyboard algorithm is applied to the simulated touches, producing a corrected text string. The effectiveness of the touchscreen keyboard algorithm at producing a correct text string can then be evaluated.

17 Claims, 4 Drawing Sheets

TOUCHSCREEN KEYBOARD SIMULATION FOR PERFORMANCE EVALUATION

CROSS REFERENCE TO RELATED APPLICATIONS

This application claims the benefit of priority of U.S. Provisional Application No. 61/593,113, filed Jan. 31, 2012, the entire content of which is hereby incorporated by reference.

BACKGROUND

Touchscreen displays are able to detect a touch within the active or display area, such as detecting whether a finger is present pressing a fixed-image touchscreen button or detecting the presence and position of a finger on a larger touchscreen display. Some touchscreens can also detect the presence of elements other than a finger, such as a stylus used to generate a digital signature, select objects, or perform other functions on a touchscreen display.

Use of a touchscreen as part of a display allows an electronic device to change a display image, and to present different buttons, images, or other regions that can be selected, manipulated, or actuated by touch. Touchscreens can therefore provide an effective user interface for cell phones, GPS devices, personal digital assistants (PDAs), computers, ATM machines, and other devices.

Touchscreens use various technologies to sense touch from a finger or stylus, such as resistive, capacitive, infrared, and acoustic sensors. Resistive sensors rely on touch to cause two resistive elements overlapping the display to contact one another completing a resistive circuit, while capacitive sensors rely on the presence of a finger changing the capacitance detected by an array of elements overlaying the display device. Infrared and acoustic touchscreens similarly rely on a finger or stylus to interrupt infrared or acoustic waves across the screen, indicating the presence and position of a touch.

Capacitive and resistive touchscreens often use transparent conductors such as Indium tin oxide (ITO) or transparent conductive polymers such as PEDOT to form an array over the display image, so that the display image can be seen through the conductive elements used to sense touch. The size, shape, and patter of circuitry have an effect on the resolution and accuracy of the touchscreen, as well as on the visibility of the circuitry overlaying the display. Other materials, such as fine line metal elements are not optically transparent but rely on their small physical width to avoid being seen by a user.

One common application for touchscreen displays is presentation of keyboards, numeric keypads, and other input displays on mobile devices such as cellular telephones or "smart" phones. But, using a mobile device display typically no larger than about two inches by three inches to display a keyboard having over 26 keys results in a relatively small area per displayed key. Each key's corresponding touchscreen actuation area associated with each key is therefore also typically significantly smaller than a typical user's finger, making touch accuracy an important factor in efficient user input using such a keyboard.

For reasons such as this, a variety of touchscreen control algorithms have been employed to accurately detect and to correct sensed user input. These algorithms include features such as determining which key was most likely pressed when multiple keys are actuated at the same time, and automatic detection and correction of apparent keying errors such as misspelling words. Performance of algorithms such as these plays an important role in the perceived usability and efficiency of a touchscreen display keyboard implementation, and testing, comparison, and optimization of such algorithms is therefore desirable to provide a better user experience.

SUMMARY

A computerized system sends a series of touchscreen keyboard touch data to a touchscreen keyboard device that receives the touchscreen keyboard touch data and processes the received string of touchscreen keyboard touch data to simulate touches to a touchscreen of the touchscreen keyboard device. A touchscreen keyboard algorithm is applied to the simulated touches, producing a corrected text string. The effectiveness of the touchscreen keyboard algorithm at producing a correct text string can then be evaluated.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how these examples may be applied to various purposes or embodiments. Other embodiments exist, and logical, mechanical, electrical, and other changes may be made. Features or limitations of various embodiments described herein, however essential to the example embodiments in which they are incorporated, do not limit other embodiments, and any reference to the invention, its elements, operation, and application serve only to define these example embodiments. The following detailed description does not, therefore, limit the scope of the various embodiments, which is defined only by the appended claims.

Touchscreens are often used as interfaces on small electronic devices such as cell phones, appliances, and other such electronic systems because the display behind the touchscreen can be easily adapted to provide instruction to the user and to receive various types of input, thereby providing an intuitive interface that requires very little user training to effectively use. Inexpensive and efficient touchscreen technologies enable incorporation of touchscreens into common consumer electronic devices, and provide a versatile and durable alternative to fixed input keys.

Figure 1:
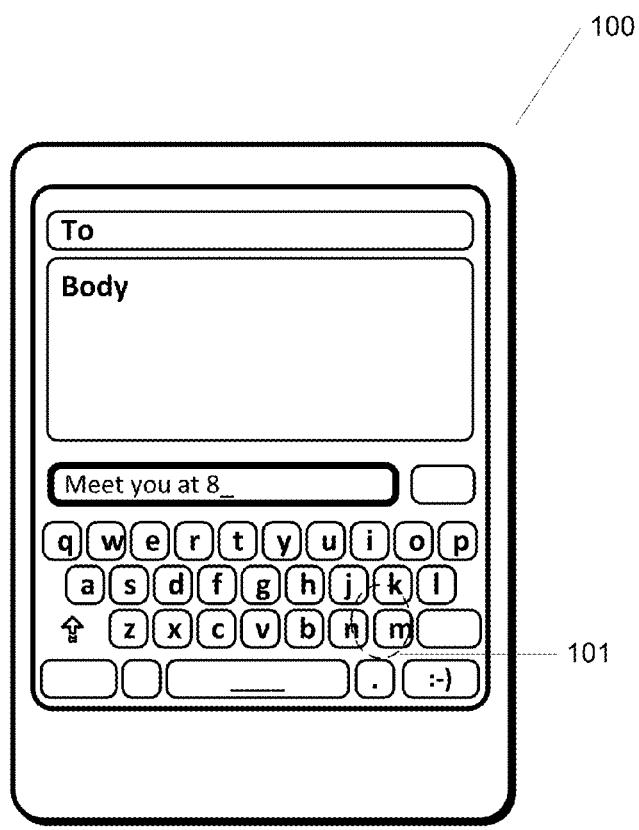
FIG. 1 shows a cellular phone with a touchscreen QWERTY keyboard, as may be used to practice some embodiments.

A typical cellular telephone touchscreen display, for example, can be configured to display a traditional "QWERTY" keyboard, and allow a user to type by selectively actuating the touchscreen portion overlaying each key. An example cellular phone with a touchscreen QWERTY keyboard is shown generally in FIG. 1 at 100. But, with each key on such a keyboard typically being perhaps a quarter inch to an eighth of an inch across, it can be difficult for a user to actuate the desired key with consistent accuracy. A typical adult finger touch is an ellipse that is approximately a third of an inch, and is therefore often significantly larger than the keys the user is trying to press, as shown at 101. A user may touch an area of the touchscreen that covers multiple keys, may touch an area that is actuates a neighboring key to a greater degree than the desired key, or may inadvertently swipe a finger across the screen while trying to touch a key thereby actuating multiple keys.

For reasons such as these, touchscreen devices such as mobile cellular phones often use one or more systems to detect and correct inadvertent touches. For example, a spell checker can be enhanced based on knowledge of the touchscreen display keyboard's QWERTY layout so that keys near a mis-struck key are favored over keys that are remote from an apparent mis-struck key. In a more detailed example, a device with a touchscreen keyboard receives the letters "xat", which is not recognized as a valid word. The word can therefore be corrected to any number of other words, such as "cat", "pat", and the like. Here, the letter "c" is adjacent to the mis-struck letter "x", while the letter "p" is approximately eight keys away, so the algorithm will favor correction to "cat" over correction to "pat".

In another example, a user strikes halfway between the letters "c" and "v" in typing the word "cat". A keyboard correction algorithm may prefer the more common word "cat" in this instance, based on its more frequent use in everyday conversation. In a more complex example, a user attempting to type the word "vat" swipes a finger across two letters, moving from "c" and "v", again leaving some ambiguity as to which word the user intended to type. Here, an algorithm determines that it is likely that the user that clearly swipes across two letters intends to actuate the second letter and touched the first inadvertently while moving a finger to actuate the intended letter, so favors the word "vat" over "cat".

Other algorithms consider factors such as what words a user has recently or commonly typed, whether a user typically miskeys in a certain direction from the center of a key, and other such factors. These are but examples of touch recognition and error correction methods that can be applied to a touchscreen keyboard. Other examples will use a variety of other factors or considerations to determine which keys a user intended to press, and may combine various factors or considerations in different ways or with various weightings to estimate an intended keystroke.

But, tweaking such algorithms and determining whether one provides better usability than another can be a complex task. A user may vary in focus, typing style, speed, how they hold a device, and other such factors between iterations, making statistically significant comparison between two or more touch algorithms difficult to accurately or repeatably produce.

Some embodiments therefore provide a simulated touch sequence for a touchscreen keypad device, operable to simulate a consistent and repeatable set of touchscreen actuations to simulate a typist. This enables automated testing of touchscreen keyboard or other input detection algorithms, and accurate comparison between algorithms using identical input strings. A better touchscreen key detection algorithm can mean a better user experience, resulting in improved satisfaction with a cell phone or other device, and improved sales.

Reliable evaluation of keyboards and algorithms has traditionally suffered from the difficulty and expense in scaling an experiment with a sufficient number of users and keystrokes to make a statistically meaningful comparison between even small numbers of variations in keyboards or algorithms.

Programmatically replaying a series of touches to multiple devices, or repeatedly playing the same precise series of touches to a device configured differently enables a more accurate and less costly comparison between devices or configurations. Precision of touches, ability to apply the exact same touches to multiple devices (either at one time or in series), and potential increase in speed of replay of touches all provide for improved accuracy and reduced cost of comparing one touchscreen algorithm to another.

Because the exact same touch data can be repeated over and over again precisely, changes in user focus, device hold position, user speed, or other such characteristics will not cause a difference in touch data between trials. Also, a user does not need to type the same string on multiple devices for each algorithm to be tested, but can type a string one time and the string can be stored in a library of sample typing data, used over a course of months or years to perform touchscreen keyboard algorithm testing.

In some embodiments, touchscreen keyboard data will desirably be recorded separately for each physical keyboard layout or resolution, so that data specific to a keyboard presentation or touchscreen resolution can be used to replay and test touchscreen keyboard algorithms. In other embodiments, touchscreen keyboard touch information can be scaled or otherwise transformed for use with similar keyboard configurations, such as where two models of the same device present the same keyboard in the same proportions but on different resolution touchscreen displays.

Being able to reuse and distribute touchscreen keying data enables cheaper and faster touchscreen testing, as test subjects do not have to be retained over long periods of time to try many combinations to optimize an algorithm. This not only reduces cost to a manufacturer and consumer, but can result in significantly more experiments or algorithm trials during development, resulting in improved usability to the end user.

Figure 2:
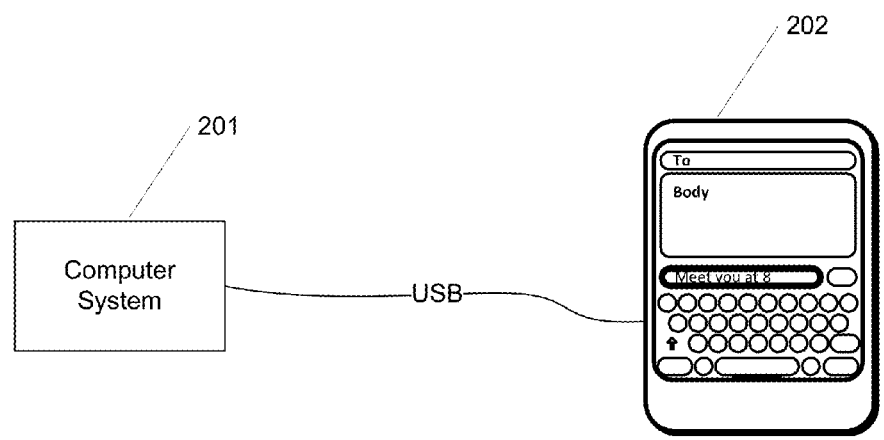
FIG. 2 shows an example system using recorded touchscreen actuations to test a touchscreen keyboard algorithm, consistent with an example embodiment.

FIG. 2 shows an example system using recorded touchscreen actuations to test a touchscreen keyboard algorithm, consistent with an example embodiment. Here, a computer 201 is coupled to a touchscreen keyboard device such as a mobile phone 202. In this example the connection is a USB port connection to the computer, but other connections such as Bluetooth, JTAG, or any other suitable wired or wireless connection can be used in alternate embodiments.

The connection between the computer and the touchscreen keyboard device will in some embodiments be able to access a debug mode, hardware abstraction layer, or other such interface to keyboard hardware such that touches sensed by the touchscreen can be detected and sent to the computer via the connection, and simulated touch coordinates or other touch data can be sent from the computer to the touchscreen keyboard device. In one specific example, the touchscreen keyboard device 202 is an Android™ tablet, Android phone, or other such device, and the computer 201 runs an Android development environment such as the commercially available Android SDK. The connection between the Android touchscreen device and the computer comprises a USB cable, which enables the computer's Android development environment to interact with a mobile device application operable to exchange touch information with the computer. Many other devices incorporating touchscreens and many other computer systems are within the scope of the examples presented here.

The mobile application in a more detailed example comprises a lightweight application that captures and logs input from the default text entry method, or the Input Method Editor (IME) on some Android devices. The application's user interface includes a TextEdit object that receives character inputs and automatic corrections from the selected IME, which is the input method being tested. The TextEdit object in a further embodiment also includes a mechanism that logs to a file all events that are received from the text entry method, enabling tracking of the keystrokes detected and the corrective actions taken by the configured IME.

The computerized system 201 can then retrieve the file, and compare the text produced by the IME to the desired phrases being virtually typed on the mobile touchscreen keyboard device. In one example, this is done by using the Android Development Bridge (ADB) tool comprising a part of the Android Software Developer's Kit (SDK).

In other embodiments, a computer need not be coupled to the touchscreen device to perform touch algorithm or other such testing, but a software developer kit (SDK) or another suitable driver or mechanism on the touchscreen device itself is employed to replay recorded touch data stored on the device to the device's configured input system. The same series of touches can be replayed several times to test different algorithms, devices, or configurations, and can be captured by the computer 201 via the interface to the touchscreen keyboard device, or captured on the touchscreen keyboard device for later use in testing alternate input algorithms.

It may be desirable in some environments to run software for initial data collection from typists or software to replay typing and capture the resulting keyed input on the test device as a standalone application on the test device rather than rely on an attached computer to log the data, as concerns regarding limited bandwidth, inaccurate or delayed timing in receiving data, and other such considerations can be reduced.

Figure 3:
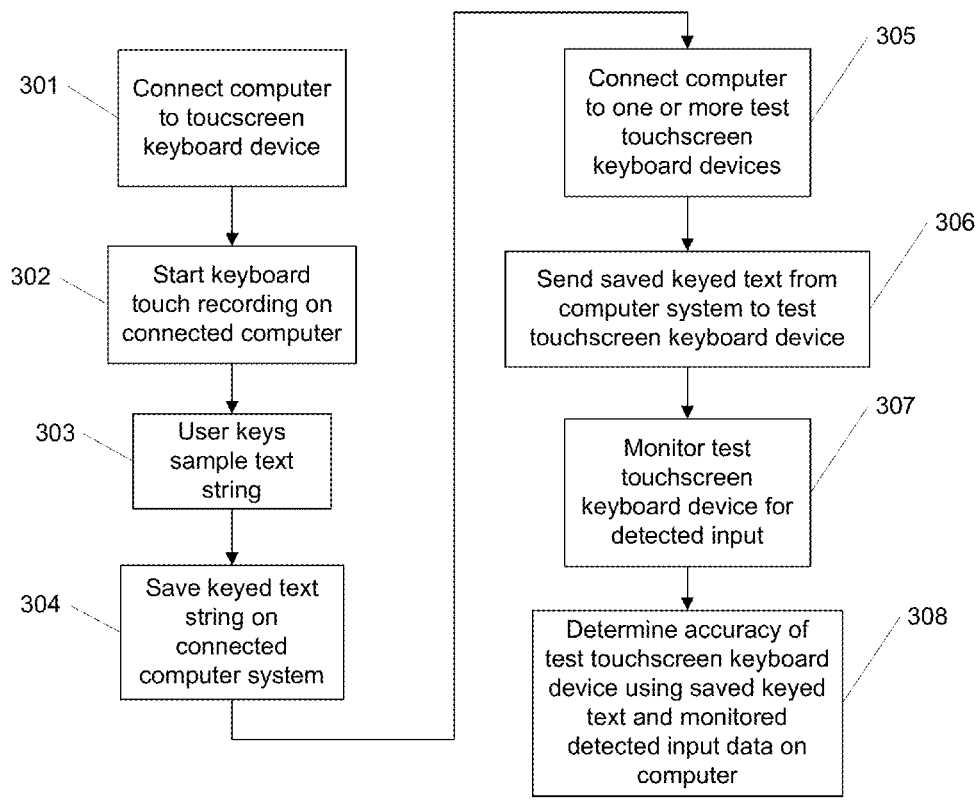
FIG. 3 illustrates a method of generating and using touch data to test a touchscreen keyboard device algorithm, consistent with an example embodiment.

FIG. 3 illustrates a method of generating and using touch data to test a touchscreen keyboard device algorithm, consistent with an example embodiment. At 301, the computer system 201 (FIG. 2) is coupled to the touchscreen keyboard device 202 (FIG. 2), such as by using a USB cable. Here, the touchscreen keyboard device 202 (FIG. 2) is an Android device, and an Android Debug Bridge is used to communicate with the device.

An application or applet is optionally started on the touchscreen keyboard device 202 to facilitate capture of touch data, or an Android Debug Bridge (ADB) is used to monitor touchscreen events by using "getevent" to capture touch events from the touchscreen display. Attributes such as the X and Y coordinates of the touch are detected and sent to the computer 201, along with other touch characteristics such as pressure, size, lift of touch, multi-touches or touches overlapping in time, or other attributes.

When the computer and touchscreen keyboard device are configured, the computerized system begins monitoring for touch events at 302. A user is then prompted to type a text string to be used as test/evaluation material at 303, and the captured touch location information is saved as a keyed text string on the computerized system at 304. In this way, a significant library of keyed text from different users can be assembled, and later used repeatedly for automated testing of touchscreen keyboard algorithms.

Capturing touch information in a more detailed example includes producing asterisks or other non-indicative symbols as feedback, to keep a user from adapting text entry to a particular touchscreen keyboard algorithm. Typists are therefore not permitted the opportunity to correct or even recognize keying errors, improving the degree to which the keyed text information represents actual, uncorrected user input. In a further example, the captured touch information is filtered to remove sever outliers, such as inadvertent touches or touches that are more than 1.5 or 2 times the key height away from the center of the assumed target key. In other examples, such miskeys are retained as a test of the touchscreen keyboard algorithm's ability to handle more severe miskeys.

The captured touch information is then employed in a touchscreen keyboard algorithm testing process, starting with coupling one or more test touchscreen keyboard devices to the computer at 305. The touchscreen keyboard device in this example is a device that has a touchscreen keyboard algorithm installed that is under test such that, and optionally may include several touchscreen keyboard devices coupled at the same time to receive the same data so that multiple touchscreen keyboard algorithms can be tested at the same time. The same physical hardware and keyboard layout are used in this example to test keyboard algorithms, but in other examples different keyboard layouts, different devices, and other configuration changes may be similarly tested by varying other characteristics of the touchscreen keyboard.

The saved touch coordinates and optionally other data are sent from the computer to the one or more touchscreen keyboard devices at 306, such as by using the Android Debug Bridge to send events using a "sendevent" command. The sent data in some embodiments is sped up, while in other embodiments is sent at the same speed with which the keystrokes were originally typed by the user at 303. Alternately, a fixed time between keystrokes, such as 150 milliseconds, can be used to simulate the speed of a typical typist. The touch coordinates have a randomized factor added in some alternate embodiments, such as varying about the recorded touch location by a random amount with a distribution about the recorded touch location, such as a Gaussian distribution, to simulate minor variations in touch location as may occur in actual use. The touch coordinates may also be scaled in some embodiments, such as where data is recorded on a touchscreen having a certain form factor and resolution but are replayed on a touchscreen keyboard device with the same form factor but higher resolution. Many other variations in replaying coordinates to a touchscreen keyboard device exist, and are within the scope of various embodiments.

The simulated touch data provided to the touchscreen keyboard device in this example includes a large number of words, such as 10 minutes, 20 minutes, or more of typing for a particular user, so that a statistically meaningful result can be obtained. Keyed touch data from a variety of users are also played to the same keyboard algorithm, enabling computation of a touchscreen keyboard algorithm's effectiveness across a variety of typing styles, and determination of what algorithms or settings work best for different typing styles so that the algorithms can be further refined.

The touchscreen keyboard device is monitored at 307 for the interpreted or detected input, including application of a touchscreen keyboard algorithm to correct misspellings and other such keying errors. Monitoring in some examples comprises storing detected input to a file, such that the file can be later downloaded to the computer 201 (FIG. 2) or otherwise provided for analysis. In other examples, the computer detects the touchscreen keyboard algorithm events directly, such as by monitoring text written to an editing field of a text entry application.

Once the simulated keystrokes have been generated and the output of the touchscreen keyboard algorithm recorded, the recorded output is compared against expected or intended text at 308. In some examples, this involves the computer 201 downloading an output file from the touchscreen keyboard device 202 and analyzing the file, while other examples includes monitoring and detecting touchscreen keyboard algorithm output in real-time or monitoring the output on the touchscreen keyboard device itself.

Determination of the accuracy of a touchscreen keyboard algorithm is performed in this example by comparing metrics such as words in error rate, characters in error rate, or other such percentages or rates. It may be desirable to evaluate word accuracy rather than character accuracy in some examples, as a typical touchscreen keyboard algorithm will attempt correction on a word-by-word basis.

Composite rates across multiple typists are further computed in some embodiments, including a variety of typists and typing styles such as fast and slow typists, typists who use one finger and typists who use both thumbs, focused typists and typists trying to perform another task at the same time, left-handed and right-handed typists, and other such variations.

Information regarding the determined accuracy can then be used to select a touchscreen algorithm for use in a device, or to refine algorithms, algorithm parameters, keyboard presentation, or other touchscreen keyboard characteristics to facilitate more accurate input. In other examples, the accuracy or recognition rate of other gestures may be similarly tested by using recorded gestures played back as simulated gestures to test various algorithms, screen configurations, or other parameters.

The systems and methods describe here are further suitable for use in testing other touchscreen inputs, such as swipes, shapes, and other gestures. The touchscreen keyboard device 202 is shown as a smart phone, but in other embodiments may be a tablet, a television or display, an appliance, or other touchscreen keyboard device.

Figure 4:
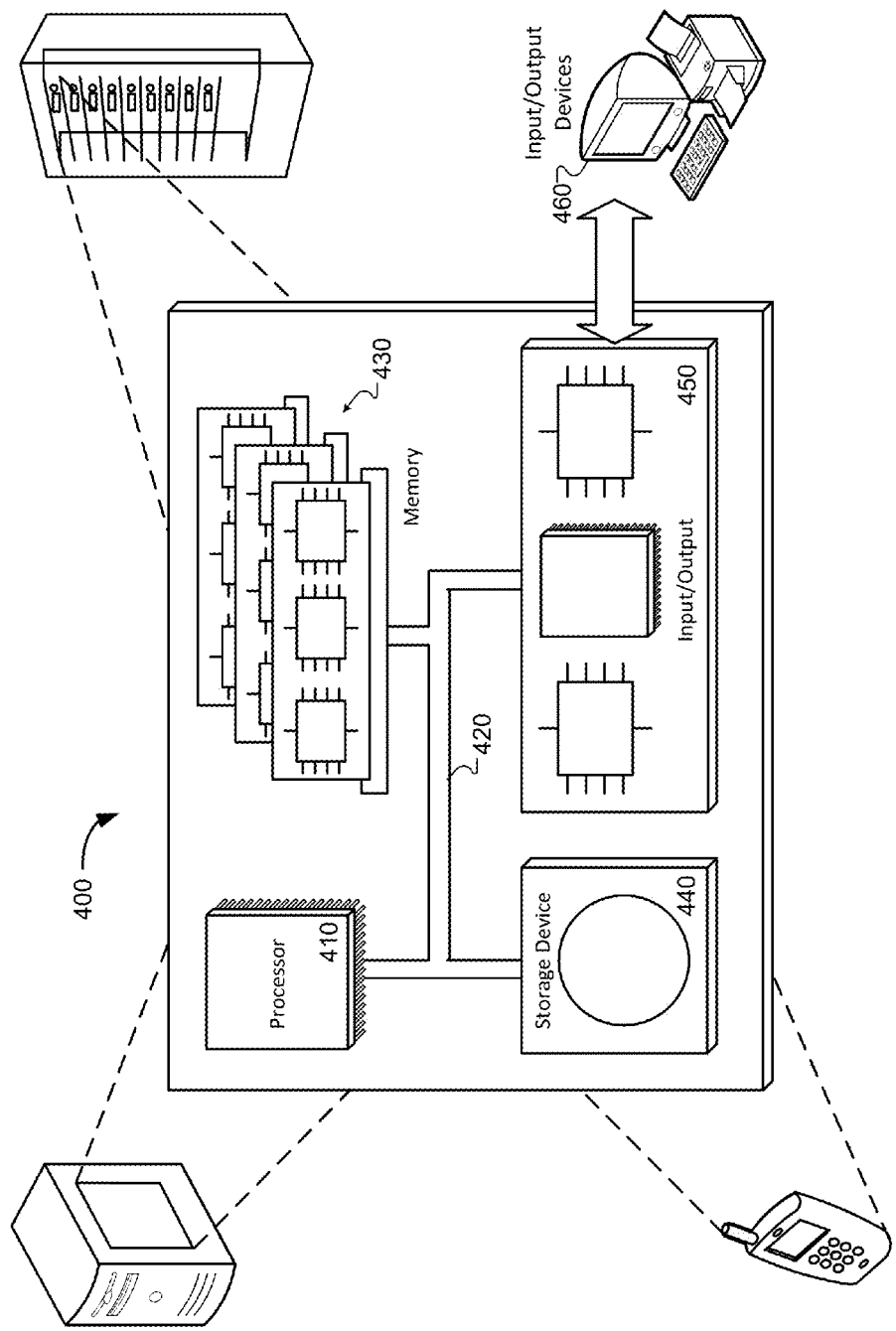
FIG. 4 is a block diagram of a computerized system, as may be used to practice various embodiments.

A more detailed example of a computer such as 201 (FIG. 2) is shown in FIG. 4, consistent with some embodiments. Here, a computer 400 includes a processor 410 that is operable to execute program instructions, causing the computer to perform various methods or tasks. The processor is couple via bus 420 to a memory 430, which is used to store information such as program instructions and other data while the computer is in operation. A storage device 440, such as a hard disk drive, nonvolatile memory, or other non-transient storage device stores information such as program instructions, data files, and other information both during operation and when the computer is turned off or not in use. The various examples described herein or variations thereof may be embodied in whole or in part in instructions stored in a machine-readable medium, such as non-transient storage 440. The computer also includes various input-output elements 450, including parallel or serial ports, USB, Firewire or IEEE 1394, and other such ports to connect the computer to external device such a printer 460. The computer itself may be a traditional persona computer, a smart phone, a rack-mount or business computer or server as shown in FIG. 4, or any other type of computer.

The example embodiments presented here illustrate how touchscreen keyboard touch events can be captured and replayed to provide more efficient testing of touchscreen keyboard algorithms, reducing the manual effort of touchscreen keyboard algorithm development and the cost involved. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments described herein.

The invention claimed is:

1. A method, comprising:
receiving, in a first computing device, a series of touchscreen keyboard touch data from a touchscreen keyboard device, wherein the series of touchscreen keyboard touch data represents touches at the touchscreen keyboard device, and wherein the first computing device and the touchscreen keyboard device are separate and distinct devices;
storing the series of touchscreen keyboard touch data at the first computing device, wherein the stored series of touchscreen touch data are later sent to the touchscreen keyboard device as a series of touchscreen keyboard simulated touch data;
sending, from the first computing device, a series of touchscreen keyboard touch data to a touchscreen keyboard device to simulate touches on the touchscreen keyboard device;
receiving, in the first computing device, a text string resulting from the touchscreen keyboard device applying a touchscreen keyboard algorithm to the series of touchscreen keyboard simulated touch data; and
evaluating, in the first computing device, the received text string for accuracy to determine an effectiveness of the applied touchscreen keyboard algorithm.

2. The method of claim 1, wherein sending the series of touchscreen keyboard simulated touch data to the touchscreen keyboard device comprises sending the series of touchscreen keyboard simulated touch data to be received by an application executing on the touchscreen keyboard device.

3. The method of claim 1, further comprising adding a randomized component to position data comprising a part of the series of touchscreen keyboard simulated touch data.

4. The method of claim 1, wherein sending the series of touchscreen keyboard simulated touch data comprises sending the data to a plurality of touchscreen keyboard devices.

5. A method, comprising:
receiving, in a first computing device, a series of touchscreen keyboard touch data from a touchscreen keyboard device, wherein the series of touchscreen keyboard touch data represents touches at the touchscreen keyboard device, wherein the first computing device and the touchscreen keyboard device are separate and distinct devices;
storing the series of touchscreen keyboard touch data at the first computing device, wherein the stored series of touchscreen touch data are later sent to the touchscreen keyboard device as a string of touchscreen keyboard simulated touch data;
receiving, in the touchscreen keyboard device, a string of touchscreen keyboard simulated touch data, and
processing the received string of touchscreen keyboard simulated touch data to simulate touches at a touchscreen of the touchscreen keyboard device;
applying a touchscreen keyboard algorithm to the string of touchscreen keyboard simulated touch data; and
receiving, in the first computing device, a text string resulting from applying the touchscreen keyboard algorithm to the string of touchscreen keyboard simulated touch data, wherein the first computing device evaluates the received text string for accuracy to determine the effectiveness of the applied touchscreen keyboard algorithm.

6. The method of claim 5, wherein receiving the string of touchscreen keyboard simulated touch data comprises receiving the string of touchscreen keyboard simulated touch data in an application or driver running on the touchscreen keyboard device.

7. The method of claim 5, wherein the touchscreen keyboard algorithm is configured to correct at least one of spelling, capitalization, and punctuation.

8. The method of claim 7, further comprising storing the text string resulting from application of the touchscreen keyboard algorithm to the string of touchscreen keyboard simulated touch data.

9. The method of claim 5, wherein the touchscreen keyboard device comprises at least one of a tablet, a smart phone, a television, or an appliance.

10. A computerized system, comprising:

an interface operable to receive a series of touchscreen keyboard touches from a touchscreen keyboard device representing touches on the touchscreen keyboard device, wherein the interface of the computerized system and the touchscreen keyboard device are separate and distinct from each other;

a storage device operable to store the series of touchscreen keyboard touches such that the stored series of touchscreen touches can later be sent to the touchscreen keyboard device as a series of touchscreen keyboard simulated touch data; and a processor;

wherein the interface is operable to send the series of touchscreen keyboard simulated touch data to the touchscreen keyboard device such that the sent series of touchscreen keyboard simulated touch data is used to simulate the series of touchscreen keyboard touches on the touchscreen keyboard device;

wherein the interface is operable to receive a text string resulting from applying, by the touchscreen keyboard device, a touchscreen keyboard algorithm to the series of touchscreen keyboard simulated touch data; and wherein the processor is operable to evaluate the received text string for accuracy to determine the effectiveness of the applied touchscreen keyboard algorithm.

11. The computerized system of claim 10, wherein the sent series of touchscreen keyboard simulated touch data is sent to an application executing on the touchscreen keyboard device.

12. The computerized system of claim 10, wherein the processor is operable to add a randomized component to position data comprising a part of the series of touchscreen keyboard touch data.

13. The computerized system of claim 10, further comprising a plurality of touchscreen keyboard devices, wherein the interface is operable to send the series of touchscreen keyboard simulated touch data to the plurality of touchscreen keyboard devices.

14. A touchscreen keyboard device, comprising:

an interface operable to send a series of touchscreen keyboard touches, representing touches at a touchscreen keyboard device, from the touchscreen keyboard device to a first computing device that stores the series of touchscreen keyboard touches, wherein the stored series of touchscreen touches can later be sent to the touchscreen keyboard device as a string of touchscreen keyboard simulated touch data, and wherein the interface is operable receive the string of touchscreen keyboard simulated touch data; and a processor operable to process the received string of touchscreen keyboard touch data to simulate touches at the touchscreen keyboard device and apply a touchscreen keyboard algorithm to the string of touchscreen keyboard simulated touch data;

wherein the first computing device receives a text string resulting from applying the touchscreen keyboard algorithm to the string of touchscreen keyboard simulated touch data in order to evaluate the received text string for accuracy to determine the effectiveness of the applied touchscreen keyboard algorithm;

wherein the interface of the touchscreen keyboard device and the first computing device are separate and distinct from each other.

15. The touchscreen keyboard device of claim 14, wherein the processor is operable to receive the string of touchscreen keyboard simulated touch data in an application or driver executed by the processor.

16. The touchscreen keyboard device of claim 14, wherein the touchscreen keyboard algorithm is configured to correct at least one of spelling, capitalization, and punctuation.

17. The touchscreen keyboard device of claim 14, wherein the touchscreen keyboard device comprises at least one of a tablet, a smart phone, a television, or an appliance.

* * * * *